May 25, 1965   I. R. BRANDER ETAL   3,185,188
METHOD AND APPARATUS FOR PACKAGING PLASTIC MATERIALS
IN ELONGATED CONTAINERS
Filed July 6, 1961   3 Sheets-Sheet 1

INVENTORS
IAN ROSS BRANDER
JOHN BRYAN SEED

BY Cushman, Darby· Cushman
ATTORNEYS

United States Patent Office 3,185,188
Patented May 25, 1965

3,185,188
METHOD AND APPARATUS FOR PACKAGING PLASTIC MATERIALS IN ELONGATED CONTAINERS
Ian Ross Brander, Ardrossan, and John Bryan Seed, West Kilbride, Scotland, assignors to Imperial Chemical Industries Limited, London, England, a corporation of Great Britain
Filed July 6, 1961, Ser. No. 122,300
Claims priority, application Great Britain, July 6, 1960, 23,612/60
17 Claims. (Cl. 141—12)

The present invention relates to the filling of plastic material into elongated containers and to apparatus therefor. More particularly the invention is applicable to the filling of plastic explosives into elongated containers of paper or other material.

In the forming and packaging of plastic materials it is usual to extrude the material through a tube or die by which means the cross-sectional shape of the extruded cord is determined. In order to give the required consolidation and moulding to the material being extruded the tube usually needs to be of a length at least equal to the width of the cord, and where it is desired to fill the material into a rigid container having one closed end it is preferred that the tube should be at least equal to the length of the container to be filled, so that the container can be placed over the tube and the material can be extruded against the closed end of the container to effect uniform filling.

However, it is well known that due to the friction between walls of the tube and the plastic the pressure required for extrusion of a liquid material of a given viscosity through tubes of constant cross-sectional area increases in proportion with increasing length of tube, and for tubes of constant length the required pressure for extrusion increases on a degree approaching the fourth power with decreasing tube diameter. Thus with conventional extrusion machines the difficulty of filling containers with plastic materials increases markedly as the ratio of length to cross-sectional area of the container increases. For a given cross-sectional area there is therefore a maximum tube length through which a plastic material of a certain viscosity can be extruded by any particular extrusion machine, this length being determined by the maximum pressure which is developed or permitted to be exerted in the said machine. In this connection the pressure required is not significantly reduced by using a tube shorter than the container and allowing the plastic material to be forced into the container; because of the friction between the container walls and the extruded material, the container in this case has the effect of increasing the tube length.

In the packaging of plastic explosive materials to form commercial blasting cartridges it is customary to extrude the material through tubes of circular cross-section into rigid cylindrical containers closed at one end, such containers generally being made from manila paper and coated with a layer of paraffin wax. Containers of other cross-sectional configurations are also filled occasionally for special blasting operations. The maximum average pressure which can be permitted to be developed by the conventional extrusion machines used for blasting explosives is for safety reasons limited to about 8.5 kg./cm.$^2$ so that hitherto it has not been possible to make satisfactorily filled cylindrical cartridges of commercial plastic blasting explosives having a ratio of length to diameter in excess of about 10 to 1. There are, however, several applications in blasting operations where it is essential to use long single cartridges rather than to use a plurality of cartridges. For example in small diameters say of 2 cm. or less there is a risk of propagation failure if the column of explosive being detonated is made discontinuous by the wrapping materials at the ends of adjacent cartridges, and the use of several cartridges introduces the further risk of the file of cartridges being divided by non-explosive material becoming lodged between the ends of adjacent cartridges. Even with explosive charges having diameters of 5 cm. where these are used under high hydrostatic pressure, as, for instance, in seismographic prospecting where pressures of up to 20 kg./cm.$^2$ are commonplace, it is preferred to use cartridges which are as long as can be conveniently handled in order to minimize the risk of separation of adjacent cartridges in the shothole and consequent risk of propagation failure.

Where exceptionally long cartridges have been required it has therefore been the custom to extrude the explosive through a tube shorter than the explosive cartridge, divide the extruded cord into the required lengths and subsequently wrap the paper wrappings around the cord to form the cartridge. Alternatively pre-formed paper cylinders were filled by introducing shorter lengths of the extruded cord of explosive successively into the cylinder and pushing these lengths towards the closed end by tamping means. The former method is not adapted to the mechanised methods of production which have become in the blasting explosives industry and the latter method requires a machine capable of an intermittent thrusting action.

It is an object of the present invention to provide an improved method of filling plastic materials into elongated containers and more particularly to provide a method by which explosive materials can be readily filled into cylindrical containers having a greater length to diameter ratio than those into which it has hitherto been possible to fill by simple extrusion.

According to the present invention a method of filling plastic material into an elongated container closed at least temporarily at one end consists in forcing the material under pressure into and through an elongated column forming means, injecting through means provided in proximity to the position at which the plastic material enters the column forming means a stream of fluid around the column of plastic material to form a substantially continuous layer between the plastic material and the inner walls of the column forming means and collecting the plastic material in said container which is positioned as an easy fit around the elongated column forming means and yieldingly held with its closed end close to the end of the elongated column forming means from which the stream of plastic material emerges so as to recede at a linear velocity less than the linear velocity at which the said stream of plastic material emerges.

The invention also includes apparatus comprising in operative combination an extruding machine having an elongated column forming member in which there is a fluid permeable portion through which a layer of fluid can be injected around a column of plastic material as the latter is extruded therethrough and a container holding and positioning device for positioning a container around the said column forming member and yieldingly holding it with its closed end adjacent to the outlet end of the said column forming member so as to recede in operation at a rate less than the rate at which the stream of plastic material emerges.

The rate at which the container recedes is preferably adjusted so that the portion of container removed from the column forming means is just completely filled without exerting undue stress on the walls of the container, and the adjustment may be done by applying an adjustable load to the closed end of the container. The container may, for instance, be located on a platform which as the container is filled is pushed away from the nozzle and is simultaneously acted on by the balancing pressure of a spring, counter weight or a fluid operated piston.

The invention will be further understood from the following detailed description of methods and apparatus for filling plastic explosive material or other similar plastic material into preformed cylindrical containers. In the drawings:

FIGURE 1A is a fragmentary view showing the filling of a container made of limp material;

Figure 1:
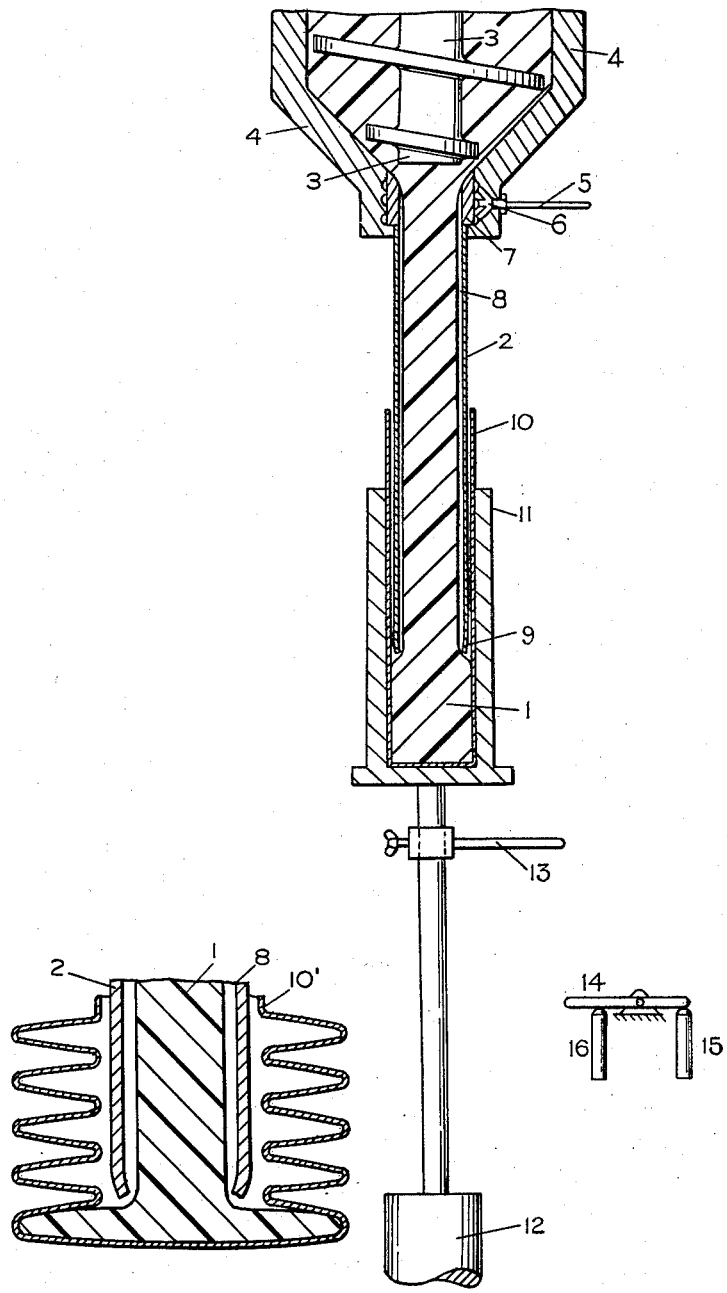
FIGURE 1 is a detailed drawing showing diagrammatically, partly in axial section, an extrusion machine, a container and the container positioning and holding means in operative relationship.
Figure 3:
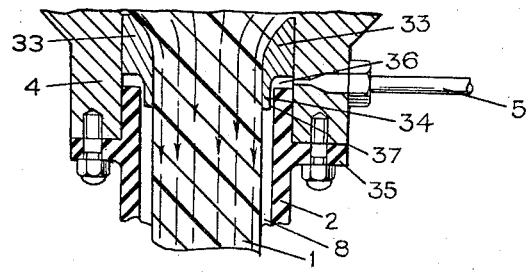
Figure 4:
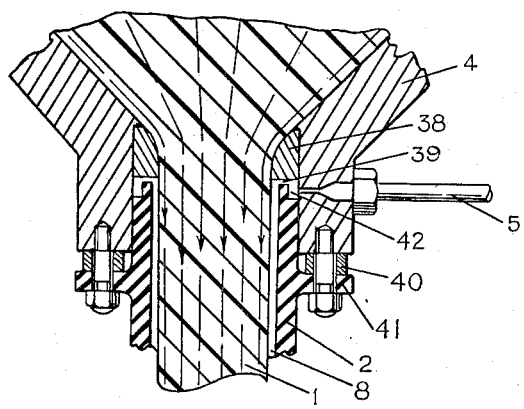
Figure 5:
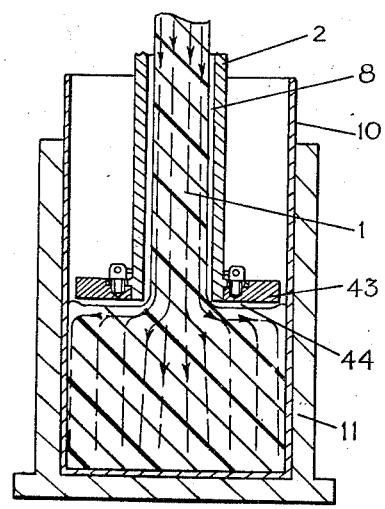

FIGURES 3 and 4 show diagrammatically in axial section fragmentary views showing means through which a layer of air may be injected around the stream of plastic material, either of which means may be used instead of that incorporated in FIGURE 1; and FIGURE 5 shows diagrammatically in axial section the filling in accordance with the invention of large cylinders using an extrusion tube of smaller diameter having a flat plate attached to its end.

The elongated column forming means of the invention can be constructed from a wide variety of materials such as metals, alloys and plastics and in choosing a suitable material the usual factors to be considered are the strength of the material, which determines the minimum wall thickness, and the chemical resistance of the material to attack by the plastic material being extruded. In a machine for filling explosive cartridges it is preferred to construct the column forming means from a metal such as copper or from copper containing alloys. When the explosive composition contains substantial proportions of corrosive salts an alloy of copper and nickel is usually to be preferred.

The column forming means is rigidly attached to a means for forcing plastic material into and through it to form an extrusion device with the column forming means acting as the tube through which the material is extruded. The plastic material can be forced into it by any of the means employed in the known extrusion machines such as by a worm rotating in a tubular casing, or by a piston advancing against the plastic mass inside a correspondingly shaped casing. Again the choice of constructional materials is determined by the circumstances but for explosives, materials such as Monel, copper, brass or plastics are preferred.

The column forming member may be shaped so as to impart to the extruded column any desired cross-sectional shape, and the cross-sectional area may be constant along the length or may vary. In one form of the invention suitable for filling cylindrical explosive cartridges this member is a tube of circular cross-section, the diameter being constant over its whole length. We have found, however, that by constricting the tube somewhat at the end from which the stream of plastic material emerges the severance of the column at this position can be achieved automatically when extrusion is stopped and a filled container is withdrawn. This is of importance since in filling explosive cartridges it is necessary to fill successive containers to an equal extent. In the absence of such a constriction withdrawal of the container might result in the cord breaking within the tube so that the portion breaking off would be too large for the container.

Fluid can be injected from an external source by any convenient means to provide a continuous layer of fluid around the stream of plastic material in the elongated column forming means. For maximum effect the fluid should be injected at or near to the end at which the plastic material enters the elongated column forming means. For example, the fluid may be injected through a narrow uniform clearance left between the tube and the casing of the extrusion device and surrounded by a manifold attached to the tube and the extrusion device, into which manifold the fluid under pressure is delivered and from which it can flow uniformly around the plastic material. It is generally preferable, however, to construct the column forming means so that an initial portion at the end at which the plastic material enters is slightly narrower than that of the remainder and to inject the fluid through the wider portion at a position adjacent to the boundary of the two portions. In this way the column is shaped substantially to its final cross-sectional area by the initial portion of the column forming means and does not require to be compressed by the fluid which is subsequently injected around it. For ease of construction and assembly it is usually convenient to form the initial portion of the column forming means with a thin walled end portion which projects a short distance into the remainder when the two portions are assembled together. The dimensions of this projection and the internal diameter of the remaining portion of the column forming means are such that there is a small clearance all around the projection. Fluid is injected through this clearance around the stream of plastic material.

Alternatively, the means through which the fluid is injected may be a structure having a plurality of relatively small, substantially uniformly distributed perforations thorugh its walls which structure forms a portion of the column forming means. In this form of the invention a section of the end of the column forming means may be made from porous material and may conveniently be permanently joined at its ends to the remaining portion of the tube and to the casing of the extruder. Suitable porous materials are sintered metals and porous ceramic materials. Sintered metal structures of bronze are particularly suitable when the plastic material is an explosive material because they can be brazed or soldered at their ends to the extrusion device and the column forming tube when these are made for instance of brass or bronze which would ordinarily be used.

The fluid which is injected around the plastic material in the column forming means may be liquid or gaseous. Gaseous fluids are in general preferable as they have the advantage that they escape or can be readily removed from the extruded material, whereas when liquids are used they adhere to the outside of the extruded column. Air is usually the most convenient gaseous fluid. As liquids such materials as lubricating oils or aqueous lubricants may be used. In the extrusion of certain explosive formulations the use of a mineral oil is advantageous in imparting a smooth surface to the extruded column and the thin film of oil on the column has no significant detrimental effect.

The pressure of the fluid being injected is adjusted so that the pressure of fluid in the layer around the stream of plastic material is just slightly in excess of the pressure being applied to the continuous column of plastic material in the column forming means in order that the fluid flow may be kept to a minimum. In general the fluid layer may be 0.2–0.4 mm. thick.

The presence of the layer of fluid around the stream of plastic material almost eliminates contact of the material with the walls of the tube so that there is practically no frictional resistance to the advance of the material. The pressure exerted on the plastic material by the extrusion device need only be slightly in excess of that required to force the material into the tube and is practically independent of the length of the tube through which the material is extruded and of the length of container being filled. The pressure required to be applied to plastic explosive to fill very long cartridges can, in fact, be substantially lower than that required to be exerted by the currently used extrusion machines in filling the normal sized cartridges of the same diameter.

The container to be filled with plastic material may be an elongated receptacle of any convenient shape closed at one end. It may, for example be fabricated in thin metal sheet, metal foil, thin plastic material, paper or the like. It is usual to fill plastic explosive materials into cylindrical containers but by means of the invention it is also possible to fill, for example, hexagonal or other polygonal section castings. The maximum length of rigid container which can be filled with apparatus according to the invention is approximately the length of the tube through which the plastic material is extruded, but when the container is made of limp material an unusually long container may be filled, as it can be positioned around the exterior of the tube in a folded manner in which it is contracted lengthwise. The containers must be such that their open ends can be easily pushed over the tube until the closed end is close to the end of the tube. This necessarily means that the internal cross-sectional area of the containers is larger than that of the extruded column of plastic material but for maximum efficiency these two areas should be as close as is convenient.

However, when the area of the container is large in comparison to the external area of the column forming means it is advantageous to fit a flat rigid plate of metal or other suitable material around the end of the column forming means which is inserted into the container. For example when cylindrical containers are to be filled by means of an extruder having an elongated nozzle of circular cross-section which is much smaller in area than the container, a flat annular plate of rigid material may advantageously be firmly fixed to the end of the nozzle to lie in the plane perpendicular to the axis of the nozzle so that it occupies a substantial part of the cross-sectional area between the nozzle and the container when the container is placed over the nozzle. When the nozzle is thus modified the surface of the material in the container is maintained even thereby enabling better control of the quantity of material filled into the containers to be maintained. The fluid emerging from the nozzle around the stream of plastic material forms a layer between the flat plate and the material in the container and when air is used it escapes through the space between the plate and the container walls. There is therefore little direct contact between the plate and the plastic material so that the material does not stick to the plate when the filled container recedes from the nozzle and the surface of the material is consequently not distorted.

Apparatus in accordance with the invention may comprise a single elongated column forming member through which plastic material is extruded with means for successively positioning over it and yieldingly holding in position during filling single containers, or a group of such members with means for positioning over them simultaneously a plurality of containers one over each member. It is preferred that the extrusion should be stopped for the period between the completion of the filling of one container and the placing of the next container to be filled in position over the column forming member with its closed end close to the end from which the plastic material emerges. This control of the extrusion may be made automatic by arranging for the extrusion to be stopped in response to a signal from a detector means, operated as a result of the container receding to a predetermined position. It is most convenient to stop the extrusion by stopping the pressure being applied to the material by the extrusion device and it has been found preferable to arrange for the pressure applied to the injected fluid to be simultaneously stopped by automatic means when the extrusion is stopped. If the fluid pressure is maintained after the pressure on the plastic material has been reduced, there is such an excess of pressure in the fluid that it tends to break the column of plastic material in the column forming member. If, on the other hand, the fluid pressure is stopped while the plastic material is being extruded the resulting contact of the material with the tube walls results in blockage of the tube with material under the maximum pressure developed in the extrusion device and this material may be difficult to remove.

In FIGURE 1 plastic material 1 is shown being extruded through a tube 2 of circular cross-section by means of an extrusion worm 3 rotating in an extruder casing 4. Compressed air is passed through the pipe 5 into a manifold 6 and thence through the wall of a tubular portion of sintered bronze 7 to form a uniform layer 8 between the plastic material 1 and the internal surface of the tube 2 and to flow in an annular stream past the plastic material 1 into the container 10 and so escape to the atmosphere. The tubular portion of sintered bronze 7 is soldered to the end of the tube 2 which is nearest to the casing 4 and is so shaped that its inner surface is in alignment with the inner surface of the tube 2. It is surrounded by a manifold 6 which distributes the supply of compressed air over the outer surface of the sintered bronze and the whole assembly is attached to the extruder casing 4. In this apparatus therefore the portion of sintered bronze 7 forms part of the column forming tube of the extruder and is positioned at the end of the tube at which the plastic material enters. The plastic material 1 is thereby surrounded with a layer of air immediately it enters the column forming tube 2. The end of the tube 2 has a constricted portion 9 which facilitates breaking of the cord of plastic material 1 when extrusion is stopped and the container 10 is rapidly withdrawn from the tube 2. The container 10 which for plastic explosives materials is conveniently made of paper, is held in position in a holder 11 attached to the piston rod of an air cylinder 12. By adjustment of the air pressure in cylinder 12 the pressure at which the plastic material 1 can be filled into the container 10 can be controlled. This pressure must be sufficient to ensure that the plastic material fills the container satisfactorily but must not be so large as to prevent extrusion. With explosives cartridges of 5 cm. diameter an air pressure of about 1.7 kg./cm.$^2$ acting on a circular piston of 7.5 cm. diameter is usually satisifactory.

The operation of the machine is controlled by an arm 13 adjustably attached to the piston rod of cylinder 12 acting on a pivoted trip lever 14. When the arm 13 moves towards the extruder the trip lever 14 operates a spring return pilot valve 15 arranged to start the filling operations, and when the said arm moves away from the extruder it again trips the trip lever 14 which in turn operates the spring return pilot valve 16 arranged to stop the filling and to cause rapid withdrawal of the holder 11 and the container 10 from the tube 2.

FIGURE 1A shows the filling of a long container 10' which is made of limp material and which may be longer than the tube 2. The container 10' is first pushed over the end of the tube 2, the material of the container 10' being folded in a manner in which it is contracted lengthwise, so that its closed end is close to the end of the tube 2. Plastic material 1 surrounded by a layer of air 8 is then extruded through the tube 2 into the container 10' while the latter moves downwardly away from the tube 2.

Figure 2:
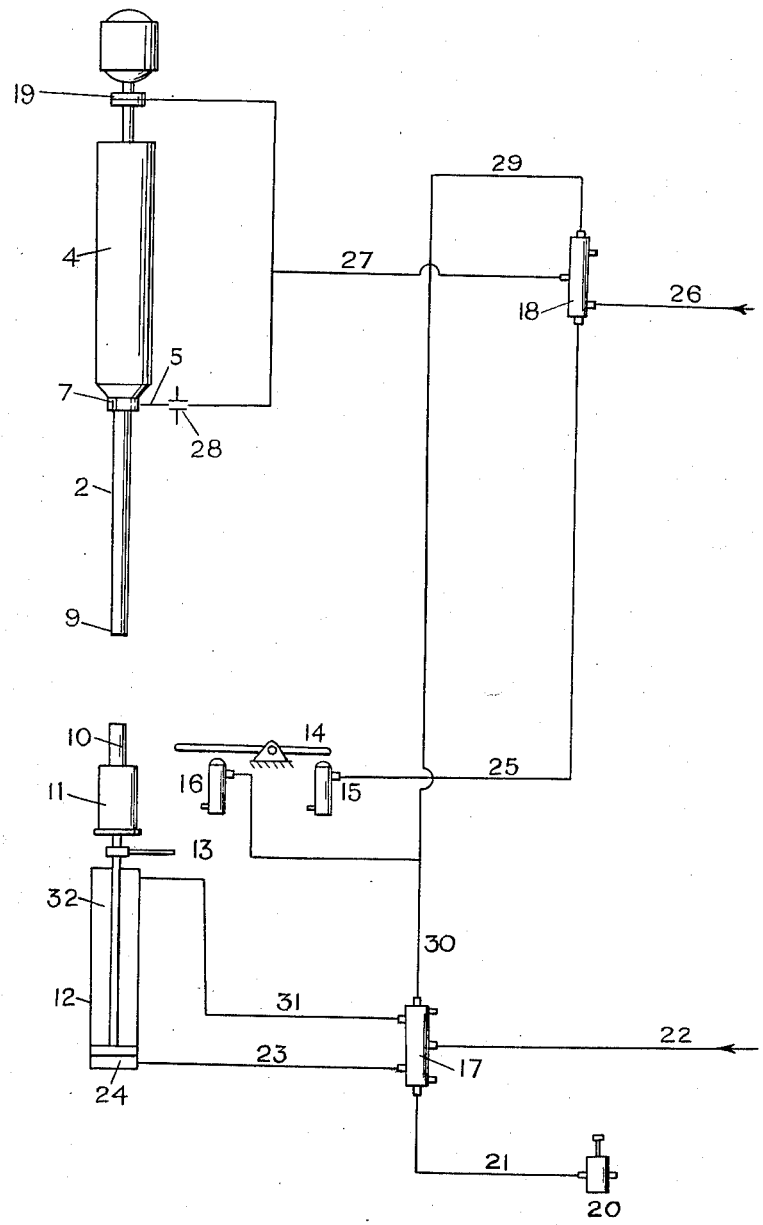
FIGURE 2 shows diagrammatically an arrangement of a pneumatic control system for the control of a machine filling single containers in accordance with the invention.

FIGURE 2 shows how the pilot valves 15 and 16 are arranged to control pressure release operated air valves 17 and 18, which in turn control the supply of air to the air cylinder 12 the portion of sintered bronze 7 and an air operated clutch 19 located in the transmission from the driving means to the extruder. The operating cycle is started by the manual operation of a valve 20 which exhausts air through a pipe 21 from the air valve 17 thereby causing air at about 1.7 kg./cm.$^2$ to flow from a constant pressure air supply pipe 22 through pipe 23 into the end 24 of cylinder 12. The piston rod of cylinder 12 moves towards the extruder and the container 10 is moved into the filling position over the tube 2. At a suitable stage of this forward movement the arm 13 operates the trip lever 14 which in turn operates the spring return pilot valve 15 causing air to be exhausted through a pipe 25 from one end of the pressure release operated air valve 18. A supply of air at 4.2 kg./cm.² is thereby caused to flow from a pipe 26 through a pipe 27 to the air operated clutch 19 and through an orifice plate 28 to the portion of sintered bronze 7. The extrusion of the plastic material into the container 10 commences; the air passes through the wall of the portion of sintered bronze 7, flows in the annulus between the plastic material and the interior wall of the tube 2 and exhausts to the atmosphere through the annulus between the container 10 and the outer surface of the tube 2. When the container 10 is fully advanced its base is close to the constricted end 9 of the tube 2. Extrusion of the plastic material into the container 10 continues until the container is filled to a predetermined extent. As the container 10 becomes filled with plastic material the holder 11 and the piston of air cylinder 12 are forced away from the extruder.

At a predetermined stage of the movement of the holder 11 away from extruder the arm 13 operates the trip lever 14 which in turn operates the pilot valve 16. Air is thereby exhausted through a pipe 29 from the air valve 18 cutting off the air supply to the clutch 19 and the portion of sintered bronze 7 and allowing the air under pressure in the pipe 27 to escape to the atmosphere. The extrusion of the plastic material is thereby stopped. The operation of the pilot valve 16 also exhausts air through a pipe 30 from the air valve 17 causing the air supply from the pipe 22 to be directed through a pipe 31 to the end 32 of air cylinder 12 and simultaneously causing the air from the end 24 to exhaust through pipe 23 and valve 17 to the atmosphere. The holder 11 and the container 10 are thereby rapidly withdrawn from the tube 2 and this rapid movement causes the breakage of the cord at the constricted end 9. Movement of the holder 11 away from the tube 2 is sufficient to enable the filled container to be removed and replaced by an empty container. The next operation of the manually operated valve 20 repeats the operating cycle of the machine.

The machine illustrated in FIGURES 1 and 2 is adapted to fill single cylindrical containers with plastic material but it could readily be adapted to the simultaneous filling of a plurality of containers.

FIGURES 3 and 4 show modified air injection means by which air is injected around the stream of plastic material through a slit accurately formed in the wall of the column forming member. In the modification shown in FIGURE 3 an accurately machined metallic tubular insert 33 having a funnel-shaped internal surface is soldered into a parallel sided portion of the extruder casing 4 to provide both the end of the conical portion of the extruder and a cylindrical portion through which the plastic material is extruded. This insert is formed with a generally cylindrical external surface but at the end from which the plastic material emerges it is externally rebated to form a thin walled tubular projection 34. This projection is accurately machined to a wall thickness of about 0.25 mm. The end of the extrusion tube 2 is constructed to be a close fit within the parallel sided tubular portion of the casing 4 and to have an internal diameter of about 0.03 mm. greater than the external diameter of the projection 34. An external flange 35 is fixed on the tube 2 so that it bears on the end of the casing 4 and is firmly held in position by a number of studs and nuts. The tube 2 is so dimensioned than an annular space 36 is left between the end face of the tube 2 and the insert. The space 36 must be sufficiently large to ensure that during the operation of the machine the air within the space becomes uniformly distributed. The tube 2 is fixed coaxially with the projection 34 and overlaps the projection so that there is a substantially uniform annular clearance 37 of about 0.0015 mm. between them. This clearance remains unaltered regardless of the degree to which the nuts holding the flange 35 to the casing 4 are tightened. During extrusion of the plastic material, air is passed from the pipe 5 into the annular space 36 and passes uniformly through the annular clearance 37 and through the annular space between the stream of material 1 and the extrusion tube 2.

In the modification shown in FIGURE 4 a metallic tubular insert 38 having a squarely cut flat face at its lower end as viewed is inserted into the casing 4. The face of the upper end of the tube 2 is also squarely cut and flat and the tube is accurately disposed within the parallel sided tubular portion of the casing 4, so that a clearance 39 about 0.015 mm. in width remains between the tube 2 and the insert 38. To ensure that the correct clearance is obtained hardened and accurately ground steel spacing washers 40 are placed on the studs fixing the tube 2 to the casing 4 and disposed between the end face of the casing and the upper surface of the fixing flange 41. The upper end of the tube 2 is externally rebated to form an annular space 42 of sufficient volume to ensure that when air is passed into it from the pipe 5 during the operation of the machine the pressure around the clearance 39 is substantially constant.

FIGURE 5 shows a modified extrusion tube being used to fill containers having a large diameter in comparison to the external diameter of the extrusion tube 2. A flat circular plate 43 having an external diameter slightly less than the internal diameter of the container 10 is fixed in position by screwing to an external flange on the end of the extrusion tube 2. The upper surface of plastic material extruded into the container through this nozzle may easily be kept level and the air entering the container forms a layer 44 between the material and the upper surface of the material and prevents the material adhering to the lower side of the plate 43.

What we claim is:

1. A method of filling plastic material into an elongated container closed at least temporarily at one end comprising the steps of: positioning one end of an elongated hollow tube means in an easy fit within said container and yieldingly holding the latter with its closed end close to said one end of the tube means; forcing the plastic material under pressure into and through said tube means to form a column of plastic material; injecting a stream of fluid into the tube means in proximity to the position where the plastic material enters the same and about the column of plastic material, to form a substantially continuous layer between the plastic material and the interior walls of the tube means; and collecting the plastic material emerging from said tube means in said container, said container receding at a linear velocity less than the linear velocity at which material emerges from said tube means.

2. A method as claimed in claim 1 in which the injected fluid is air.

3. A method of filling plastic materials into long containers made from limp material in accordance with claim 1 in which the unfilled container is positioned around the exterior of the tube means in a folded manner in which it is contracted lengthwise.

4. A method in accordance with claim 1 wherein said container is formed of paper and said plastic material is an explosive composition.

5. An apparatus for filling plastic material into elongated containers comprising: an extruding machine; an elongated column forming means of hollow construction operatively connected to the discharge of said extruding machine, said column forming means including a fluid permeable portion for introducing a layer of fluid about the interior wall of said column forming means; and means for positioning a container around said column forming means and yieldingly holding said container with the closed end adjacent to the outlet of said column forming means, said holding and positioning means being operative to recede at a rate less than the rate at which the stream of plastic material emerges from said column forming means.

6. An apparatus as claimed in claim 5 in which the column forming means includes an elongated tube of circular cross-section which is somewhat constricted at the end from which the plastic material emerges.

7. An apparatus as claimed in claim 5 in which the fluid permeable portion of the column forming means is formed with at least one narrow passage through its wall.

8. An apparatus as claimed in claim 7 in which the fluid permeable portion of the column forming means comprises a structure having a plurality of small uniformly distributed perforations.

9. An apparatus as claimed in claim 8 in which the said structure is formed from a sintered metal.

10. An apparatus as claimed in claim 7 in which the column forming means has a short portion at the end at which in operation the plastic material enters which portion is narrower than the remaining portion of the said means and the said fluid permeable portion is disposed adjacent to the said narrower portion.

11. An apparatus as claimed in claim 10 in which there is a narrow clearance between the said short narrower portions and the remaining portion of the column forming means which clearance is adapted in operation to permit the injection of fluid therethrough.

12. An apparatus as claimed in claim 11 in which the said short portion of the column forming means is formed with a thin walled end portion which projects a short distance into the remaining portion of the column forming means.

13. An apparatus as claimed in claim 5 in which a flat plate of rigid material is fixed around the exterior surface of the column forming means at the end which in operation is inserted into the elongated container.

14. An apparatus as claimed in claim 5 comprising detector means adapted in operation to cause the simultaneous stopping of the extrusion and the injection of fluid when the container being filled recedes to a predetermined position.

15. An apparatus as claimed in claim 5 in which the container holding and positioning means is attached to a fluid operated piston.

16. Method defined in claim 1 wherein said material is forced into said column by continuous extrusion.

17. Apparatus defined in claim 5 wherein said extruding machine includes means for continuously extruding the plastic material.

References Cited by the Examiner
UNITED STATES PATENTS

| | | | |
|---|---|---|---|
| 617,863 | 1/99 | Rider | 141—195 |
| 1,690,067 | 10/28 | Weeks | 141—253 XR |
| 2,524,560 | 10/50 | Cote | 141—12 |
| 2,564,969 | 8/51 | Goldberg | 141—67 |
| 2,778,387 | 1/57 | Diehl | 141—257 XR |
| 2,981,298 | 4/61 | Vogt | 141—263 XR |
| 2,985,201 | 5/61 | Baker | 141—12 |

LAVERNE D. GEIGER, *Primary Examiner.*